United States Patent [19]
Gaeta et al.

[11] Patent Number: 6,160,935
[45] Date of Patent: Dec. 12, 2000

[54] METHOD FOR CREATING A FIBER OPTIC SECTION HAVING SPATIAL GRATING STRENGTH PERTURBATIONS

[75] Inventors: Celestino J. Gaeta, Simi Valley; Stephen L. Bourgholtzer, West Hills; Willie W. Ng, Agoura Hills, all of Calif.

[73] Assignee: Hughes Electronics Corporation, El Segundo, Calif.

[21] Appl. No.: 09/430,416

[22] Filed: Oct. 29, 1999

Related U.S. Application Data

[62] Division of application No. 09/064,464, Apr. 22, 1998, Pat. No. 6,005,877.

[51] Int. Cl.[7] .................................................. G02B 6/34
[52] U.S. Cl. ............................ 385/37; 359/569; 430/290; 430/321
[58] Field of Search .................................. 430/290, 321; 385/37; 372/6, 96, 102; 359/566, 569, 570, 573, 574, 575

[56] References Cited

U.S. PATENT DOCUMENTS

| | | | |
|---|---|---|---|
| 5,091,916 | 2/1992 | Cimini, Jr. et al. | 372/96 |
| 5,177,562 | 1/1993 | Wysocki et al. | 356/350 |
| 5,185,749 | 2/1993 | Kalman et al. | 372/6 |
| 5,647,038 | 7/1997 | Minden et al. | 385/37 |
| 5,701,318 | 12/1997 | Digonnet et al. | 372/6 |
| 5,715,263 | 2/1998 | Ventrudo et al. | 372/6 |
| 5,745,617 | 4/1998 | Starodubov et al. | 385/37 |
| 5,764,829 | 6/1998 | Judkins et al. | 385/37 |
| 5,805,751 | 9/1998 | Kewitsch et al. | 385/37 X |
| 5,881,186 | 3/1999 | Starodubov | 385/37 |
| 5,945,261 | 8/1999 | Rourke | 430/321 |
| 5,953,471 | 9/1999 | Espindola et al. | 385/37 |
| 5,996,375 | 12/1999 | Nakai et al. | 430/290 X |
| 6,005,877 | 12/1999 | Gaeta et al. | 372/6 |

*Primary Examiner*—John D. Lee
*Attorney, Agent, or Firm*—V. D. Duraiswamy; M. W. Sales

[57] ABSTRACT

A method for creating nonuniform grating strengths within fiber optic includes exposing photosensitive fiber optic material to an optical source for various periods of time through a mask. As the fiber optic material is exposed, the grating strength of the fiber changes. By linearly exposing the fiber optic material to different durations of optical energy, nonuniform grating strengths are created within the fiber, thereby creating a fiber optic section having asymmetric grating strengths.

5 Claims, 2 Drawing Sheets

METHOD FOR CREATING A FIBER OPTIC SECTION HAVING SPATIAL GRATING STRENGTH PERTURBATIONS

This is a division of application Ser. No. 09/064,464 filed Apr. 22, 1998 now U.S. Pat. No. 6,005,877.

This invention was made with Government support under Agreement No. DAAL01-95-2-3505 awarded by the Department of the Army. The Government has certain rights in this invention.

BACKGROUND OF THE INVENTION (a) Field of the Invention

The present invention relates generally to fiber lasers and, more particularly to a fiber laser having asymmetric output ports.

(b) Description of Related Art

Fiber lasers are used in a variety of applications. As with all lasers, a fiber laser generates coherent light wherein the amplitude, polarization, frequency or wavelength, and phase of the output laser light can be controlled. In general, fiber lasers include an optical pump source, two reflectors comprising the optical cavity of a resonator, and an active region within the cavity. Unlike other lasers, the cavity and active region of a fiber laser are formed in an optical fiber. The fiber generally includes a doped glass core that acts as the laser's active region. In operation, the pump is coupled, via one end of the resonator, to the doped-glass core active region. The ions in the doped core are excited by the pump to generate light that is reflected between the reflectors. At least one of the reflectors of the resonator is partially reflective, thereby allowing a portion of the laser light to escape the cavity as the laser output.

Erbium is commonly used as a dopant for fiber lasers. The doped optical fiber is pumped with an optical source having a wavelength $\lambda_p$. As the doped optical fiber is pumped above a threshold level it lases, emitting coherent optical energy at a wavelength $\lambda_s$.

Fiber lasers have many uses in the communications industry including telecommunications or ether systems using coherent detection methods. Fiber lasers may also be used as local oscillators in commercial radar applications. Recently, fiber lasers have been proposed for use in automobile collision-avoidance systems.

Two configurations of fiber lasers known in the art are the distributed Bragg-reflector (DBR) configuration and the distributed feedback (DFB) configuration. The DBR laser uses a DBR element and at least one other reflector, which is typically a DBR, to provide the necessary optical feedback for the narrowband lasing process. The DBR laser requires spectral alignment of the distinct DBR elements, which is difficult to achieve in a manufacturing situation. Alignment of the DBR elements is time consuming and expensive. A further disadvantage of the DBR laser is that it generally requires a long cavity length (relative to a DFB laser) to separate internal reflections that form in the cavity of the laser. The relatively long cavity length is also required to obtain proper spacing of the allowed lasing frequencies (longitudinal modes) with respect to the spectral bandwidth of net gain of the laser related to the bandwidth of the DBR elements and ensure one lasing frequency. Long cavity lengths in high erbium concentration doped fibers can lead to increased noise bursts during laser operation. These noise bursts are due to the groups of erbium ions that collect in a nonuniform manner within the cavity.

In DBR fiber lasers, it is known to adjust the reflector elements so that most of the output power flows from one end of the laser cavity. Typically only one of two output ports provides the necessary power output from the laser, which lowers laser cavity loss and laser threshold power for oscillation.

The distributed feedback (DFB) laser configuration uses a short cavity (relative to a DBR) because the grating reflector spans the length of the cavity, thereby distributing the optical feedback. The grating reflector used is the same length as an individual reflector element in an analogous DBR configuration with identical frequency discrimination. Due to the shorter cavity length there are fewer erbium ion clusters within the cavity as compared to the longer cavity of a DBR laser. Therefore, there is a lower probability of noise bursts during laser operation of a DFB fiber laser. The longitudinal mode spacing is approximately the same as the bandwidth of the grating reflectivity, which leads to ease of single frequency laser operation. Another advantage that the DFB laser has over the DBR laser is the elimination of the need to spectrally align distinct reflectors because only a single DBR reflector is used. Therefore, the DFB laser is easier to manufacture than the DBR laser Asseh et al. discloses a DFB fiber laser in 10 cm $Yb^{3-}$ DFB fibre laser with permanent phase shifted grating, Electronics Letters, Jun. 8th, 1995, Vol. 31, No. 12, p.969–70.

DFB fiber lasers are symmetric in nature, which precludes an asymmetric power flow design. That is, it is currently available technology does not allow on to design a DFB fiber laser that is symmetric yet does not output the same power from both ends of the laser.

It can be readily appreciated that the DFB laser configuration provides significant advantages over the DBR laser configuration. However, known DFB fiber laser configurations cannot be designed for asymmetric power flow, which is desirable in many control and communication situations.

SUMMARY OF THE INVENTION

The present invention is embodied in a distributed feedback (DFB) fiber laser having a laser cavity, a high power output port, and a low power output port. The length of the fiber laser cavity has a designed spatial variation in grating strength.

The present invention is also embodied in a method for creating a fiber optic section having a spatial variation in grating strength. The fiber optic section is created using a photosensitive optical fiber, an optical energy source, a mask between the photosensitive optical fiber and the optical energy source, and a shield between the optical energy source and the mask. The varying grating pattern is created by exposing the photosensitive optical fiber with the optical energy source and moving the shield linearly from a first position to a second position.

The invention itself, together with further objects and attendant advantages, will best be understood by reference to the following detailed description, taken in conjunction with the accompanying drawings.

DESCRIPTION OF THE PREFERRED EMBODIMENTS

The present invention is embodied in a distributed feedback (DFB) fiber optic laser having asymmetrical output ports. Traditionally, the symmetric nature of a standard DFB laser has precluded an asymmetric power flow design. The present invention uses varying grating strength as a function of axial position in the fiber laser to provide asymmetric output ports.

Figure 1:
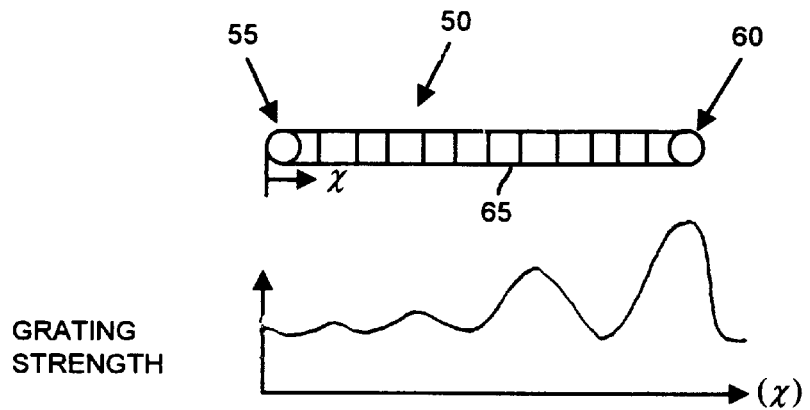
FIG. 1 is a schematic diagram representing an embodiment of the DFB fiber laser of the present invention and a graph of the grating strength of the fiber as a function of position.

Referring now to FIG. 1, a DFB fiber optic laser 50 is shown. The laser 50 includes a high power port 55 and a low power port 60. The laser 50 includes a number of segments 65, wherein the perturbation in the grating strength (i.e., the grating index or the index of refraction) of the segments increases with position from left to right. A graph 70 showing grating index as a function of fiber position (x) is shown below the laser 50. As shown in the graph 70 the amplitude of grating index perturbations increases from a low peak value at the high power port to a high peak value at the high power port. The grating index perturbations in the fiber from the high power port 55 to the low power port 60 result in different reflectivity from the high power port 55 to the low power port 60. A high reflectivity results for light propagating within the laser 50 in the direction of large perturbation of the grating index. Conversely, the counter-propagating optical energy that encounters small perturbations in the grating index sees a lower reflectivity.

The variations in reflectivity from one end of the laser 50 to the other make it possible to have different power output at the ports 55, 60 of the laser 50. For example, as optical energy propagates toward the low power port 60 it is reflected to a large extent. The energy that is not reflected at the low power port 60 is transmitted from the low power port 60. As optical energy propagates toward the high power port 55, some of the energy is reflected and some of the energy is transmitted from the high power port 55.

The laser 50 of the present invention may be pumped through either the high power port 55 or the low power port 60, the grating index of the fiber does not affect the pump wavelength power. When sufficient pump energy is coupled to either port 55, 60 the laser 50 becomes active and outputs an optical signal from both of the ports 55, 60. Table 1 illustrates typical power output from the laser output ports 55, 60 as the laser is pumped through one of the ports 55, 60. The empirical results as shown in Table 1 represent the variation in power output between the high power port 55 and the low power port.

TABLE 1

| Pump Port | Output Port Measured | Power Level Measured ($\mu$W) |
|---|---|---|
| Low | Low | 10 |
| Low | High | 1000 |
| High | Low | 25 |
| High | High | 525 |

Figure 2:
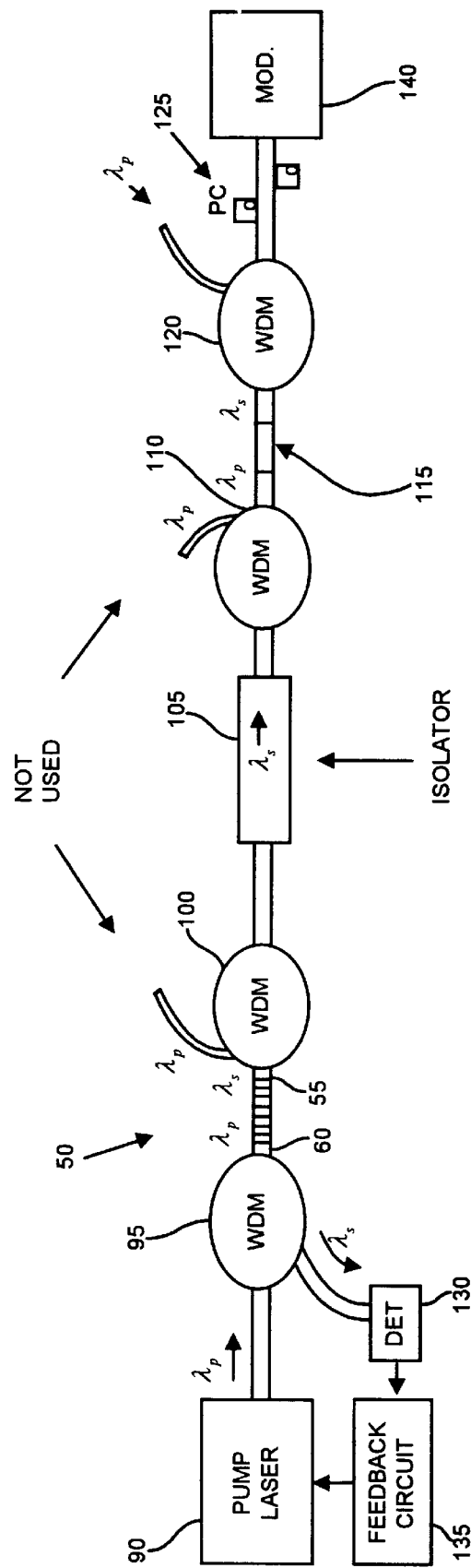
FIG. 2 is a schematic diagram of a digital optical communication system employing a fiber laser embodying the present invention.

FIG. 2 is a schematic diagram of an optical communication transmitter 80 using the fiber laser 50 of the present invention. The communication system 80 generally includes a pump laser 90, a plurality of wavelength division multiplexers (WDM) 95, 100, 110, 120, an optical isolator 105, a fiber amplifier 115, a polarization controller 125, and the fiber laser 50 of the present invention. The communication system 80 also generally includes an optical detector 130 and a feedback circuit 135 that are used in a feedback configuration to control the pump laser 90 in order to minimize amplitude noise in the fiber laser output power.

The pump laser 90 provides optical energy $\lambda_p$ to the fiber laser low power port 60, via a first WDM. The WDM device is designed to allow light at two wavelengths to be present at one port. However, only ligate at single wavelengths is present at each of the remaining two ports. For example, the port of the WDM 95 that is connected to fiber laser 50 has both the wavelength of the pump laser $\lambda_p$ and the wavelength of the fiber laser output signal $\lambda_s$. The WDM 95 port connected to the pump laser has only the pump wavelength $\lambda_p$ and the WDM 95 port connected to the detector 130 has only the fiber laser output signal $\lambda_s$.

As sufficient energy from the pump laser 90 reaches the fiber laser 50, the fiber laser 50 begins to lase emitting light at wavelength $\lambda_s$. The majority of the fiber laser output signal and the pump signal are passed out the high output port 55 to another WDM 100, which separates the two signals to two different ports. This strips the pump signal from the fiber laser signal. The fiber laser signal is passed to the optical isolator 105, which minimizes back-reflections that may destabilize the fiber laser 50. From the optical isolator 105 the fiber laser signal is passed to a WDM 110 that combines the fiber laser signal with the pump signal and couples both signals to the fiber amplifier 115. The fiber amplifier uses the pump signal to amplify the fiber laser signal. In one Embodiment the fiber amplifier 115 may be a Lycom™ product having part number R47PM02.

Another WDM 120 is used to strip the pump energy from the fiber laser energy. The port of the WDM 120 having the energy from the fiber laser is coupled to the polarization controller 125, which properly polarizes the energy for use by an optical intensity modulator 140. In one embodiment the modulator 140 may be fabricated from lithium niobate and may be purchased from Uniphase Telecommunications Products.

The energy from the fiber laser 50 that is not coupled out of the high output port 55 is coupled out of the low output port 60. The signal from the low output port 60 is coupled to the WDM 95 and back to the detector 130. The detector 130 converts the optical signal into an electrical signal that is coupled to the feedback circuit 135. The feedback circuit 135 processes the electrical signals to derive a control signal related to the amplitude noise in the fiber. The signal is used to control the amplitude noise in the laser by adjusting the pump laser output. If the fiber laser 50 is not being pumped properly the feedback circuit 135 adjusts the pump laser 90 to properly pump the fiber laser 50. Digital communications using a system such as the one shown in FIG. 2 yield very low bit error rates ($\leq 10^{-12}$).

Figure 3:
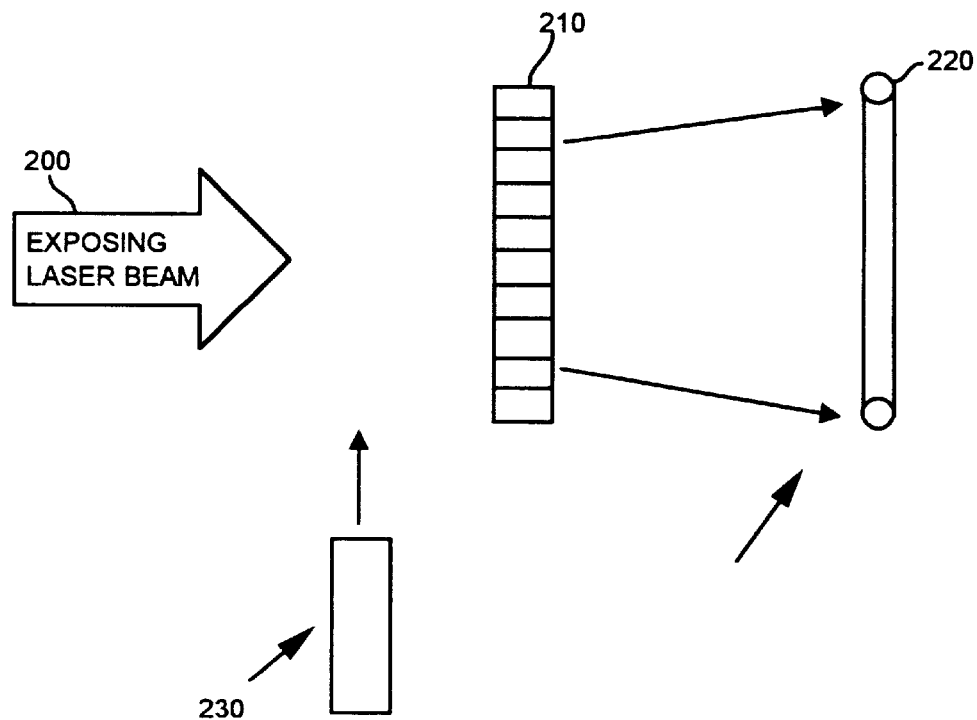
FIG. 3 is a diagram showing a configuration that may be used in the fabrication process of the present invention.

FIG. 3 is a diagram illustrating a configuration that may be used to produce sections of optical fiber having the proper grating for creating the fiber laser of the present invention. The configuration includes a laser source 200, a phase mask 210, a section of photosensitive, laser active optical fiber 220, and a laser shield 230.

The laser source 200 is preferably a KrF eximer laser that emits energy at a wavelength of 248 nanometers (nm). Energy from the laser source 200 passes through the phase mask 210, which is designed to direct a large fraction of the energy into the +1 and −1 diffracted orders. These two optical fields overlap in the vicinity of the phase mask to form an optical interference pattern. The optical fiber 220, which is photosensitive to the laser source 200, is placed within the region of the interference pattern and converts the intensity pattern into a similar variation in the index of refraction. Due to this optical damaging effect an internal grating is formed within the optical fiber 220. The longer that the optical fiber 220 is exposed to the energy from the laser sources 200, the more the local perturbation of the index of refraction of the fiber is increased.

To create a fiber that has a grating profile as shown in the graph 70 of FIG. 1, the laser shield 230 is moved linearly across the interface between the laser source 200 and the phase mask 210. As the laser shield 230 blocks energy from the optical fiber 220 the optical damage to the fiber is stopped and the grating index perturbation of the fiber stops increasing. Therefore, as the laser shield 230 moves linearly from blocking none of the laser energy from the fiber to blocking all laser energy from the fiber, a varying grating strength is created.

Of course, it should be understood that a range of changes and modifications can be made to the preferred embodiment described above. For example, rather than using a mask, a spot beam laser may be used to scan the length of the fiber at various speeds to create the grating perturbations in the fiber. Alternatively, a fixed aperture laser may be moved across the fiber and paused at various locations to create the grating perturbations in the fiber. It is therefore intended that the foregoing detailed description be regarded as illustrative rather than limiting and that it be understood that it is the following claims, including all equivalents, which are intended to define the scope of this invention.

What is claimed is:

1. A method for creating a fiber optic section having a spatial variation in grating index perturbations, the method comprising the steps of:

providing a photosensitive optical fiber sensitive to optical energy of a first frequency;

providing an optical energy source outputting optical energy at the first frequency, the optical energy source is oriented in such a manner to project its output energy toward the photosensitive optical fiber;

providing a mask between the photosensitive optical fiber and the optical energy source;

providing a shield between the optical energy source and the mask;

exposing a portion of the photosensitive optical fiber with the optical energy source, the exposed portion having an axial center; and moving the shield from a first position to a second position, so that when the shield is in the first position substantially none of the optical energy from the optical energy source is blocked from the photosensitive optical fiber by the shield and when the shield is in the second position substantially all of the optical energy from the optical energy source is blocked from the photosensitive optical fiber by the shield, to create grating index perturbations on a first side of the axial center of the exposed portion that are asymmetric with respect to grating index perturbations on a second side of the axial center of the exposed portion.

2. The method of claim 1, wherein the photosensitive optical fiber is doped with erbium.

3. The method of claim 1, wherein the optical energy source comprises a KrF excimer laser.

4. The method of claim 1, wherein the shield movement is perpendicular to the optical energy source and parallel with the optical fiber.

5. The method of claim 1, wherein the step of exposing comprises creating a peak grating index on the first side greater than a peak grating index on the second side.

* * * * *